United States Patent
Pichon et al.

[11] Patent Number: 5,281,013
[45] Date of Patent: Jan. 25, 1994

[54] INTEGRATED PRESSURE GENERATING AND CONTROL DEVICE

[75] Inventors: Jean-Michel Pichon, Messy; Philippe Bourlon, Aubervilliers, both of France

[73] Assignee: Bendix Europe Services Techniques, Drancy, France

[21] Appl. No.: 866,630

[22] Filed: Apr. 10, 1992

[30] Foreign Application Priority Data

Apr. 17, 1991 [FR] France ................ 91 04705

[51] Int. Cl.⁵ .................. B60T 13/00; G05D 16/20
[52] U.S. Cl. .................. 303/116.4; 417/471
[58] Field of Search ........... 303/10, 11, 1, 116 PC, 303/113 R, 119 SV; 417/471, 423.14; 303/113.1, 116.4, 119.2

[56] References Cited

U.S. PATENT DOCUMENTS

| | | | |
|---|---|---|---|
| 3,799,704 | 3/1974 | Kuck | 417/471 |
| 4,177,021 | 12/1979 | Niedermeyer | 417/423.15 |
| 4,568,131 | 2/1986 | Blomberg et al. | 303/116 PC |
| 4,676,454 | 6/1987 | Zompolas et al. | 303/1 |
| 4,690,465 | 9/1987 | Takeda et al. | 303/116 PC |
| 4,953,918 | 9/1990 | Hashida et al. | 303/116 PC |
| 5,022,717 | 6/1991 | Heibel et al. | 303/119 SV |
| 5,035,469 | 7/1991 | Geilen et al. | 303/119 SV |
| 5,040,853 | 8/1991 | Burgdorf et al. | 303/119 SV |

FOREIGN PATENT DOCUMENTS

| | | |
|---|---|---|
| 0176839 | 4/1986 | European Pat. Off. |
| 0373551 | 6/1990 | European Pat. Off. |
| 0379957 | 8/1990 | European Pat. Off. |
| 2386924 | 11/1978 | France |
| 2619875 | 3/1989 | France |
| 58-156442 | 9/1983 | Japan |
| 3-276853 | 12/1991 | Japan |
| 8301929 | 6/1983 | World Int. Prop. O. |

Primary Examiner—Matthew C. Graham
Attorney, Agent, or Firm—Larry J. Palguta; Ken C. Decker

[57] ABSTRACT

The invention relates to a hydraulic device for braking the wheels of a vehicle, especially for wheel anti-lock and/or anti-slip functions, comprising, between a chamber of a master cylinder and at least one brake motor, a plurality of solenoid valves (36) and a hydraulic pump driven by an electric motor including a rotor (10) arranged between two bearings (12, 14) and enclosed in a cylindrical sleeve (20) made of metallic material, the rotor driving in rotation an eccentric cam (24) imparting an alternating translational movement to radial pistons (26), the delivery outlet of the pump being connected to the solenoid valves (36) via hydraulic slides by way of fluid circulation channels (32, 34). According to the invention, the sleeve (20), in which the rotor is accommodated, is enclosed in a housing (30) made of non-magnetic material. The fluid circulation channels (32, 34) and the solenoid valves (36) extend in the housing.

11 Claims, 3 Drawing Sheets

INTEGRATED PRESSURE GENERATING AND CONTROL DEVICE

BACKGROUND OF THE INVENTION

The present invention relates to a hydraulic device particularly intended for a braking circuit of the wheels of a vehicle, comprising, between a chamber of a master cylinder and at least one brake motor, a plurality of solenoid valves and a hydraulic pump driven by an electric motor consisting of a rotor enclosed in a cylindrical sleeve made of metallic material.

Such a device is generally used for performing the functions of anti-lock wheel braking and of anti-slip wheel acceleration.

The documents EP-A-0,379,957 and EP-A-0,373,551, among many others, describe a device of this type.

As a general rule, such a device consists of two subassemblies. One is hydroelectrical and contains the fluid circulation channels, the solenoid valves and the various hydraulic slides, while the other consists solely of the drive motor for the pistons of the pump. In fact, the technologies put into practice in each of these subassemblies are so different that each of these subassemblies is manufactured by different craftsmen, the subassembly comprising the electric motor being connected operationally to the other subassembly only after the device has been assembled.

Now many problems arise in respect of the complete assembly. Of these, mention may be made of the complexity of the electrical connections as a result of the hostile environment where the device is to function, the noise occurring as a result of the operational functioning of the device, the cooling of the motor, especially when the device functions in the anti-slip acceleration mode, etc. In addition to this, there is the need to reduce the outer dimensions of the device in view of the small space available in the engine compartment of a modern vehicle and, of course, the need to reduce the cost of this device, without adversely affecting its performance. The present invention aims to solve the aforementioned problems, while at the same time obtaining the abovementioned reductions.

SUMMARY OF THE INVENTION

According to the invention, the metal sleeve, in which the rotor of the motor is located, is enclosed in a housing made of non-magnetic material, and both the fluid circulation channels and the solenoid valves extend in this housing.

This affords the desired advantages, namely an increase in the thermal and the acoustic inertia and cooling by the circulation of fluid along the motor. Furthermore, the electrical connections can then be made in a specific space and the axial length of the device can be reduced considerably.

If, moreover, the axes of the solenoid valves and of the channels are substantially parallel to that of the motor, a clear reduction in the production costs is obtained because of the ease of machining of the components.

Preferably, the housing is closed radially on either side of the metal sleeve by means of covers, of which one has the electrical connections and the other the pump pistons and the hydraulic slides. Fastening means, such as screws, retain the covers sealingly against the housing for the hydraulic parts.

The housing can advantageously be produced from aluminum or from a thermosetting material.

BRIEF DESCRIPTION OF THE DRAWINGS

The invention will now be described by way of example with reference to the accompanying drawings in which.

DESCRIPTION OF THE PREFERRED EMBODIMENTS

Figure 1:
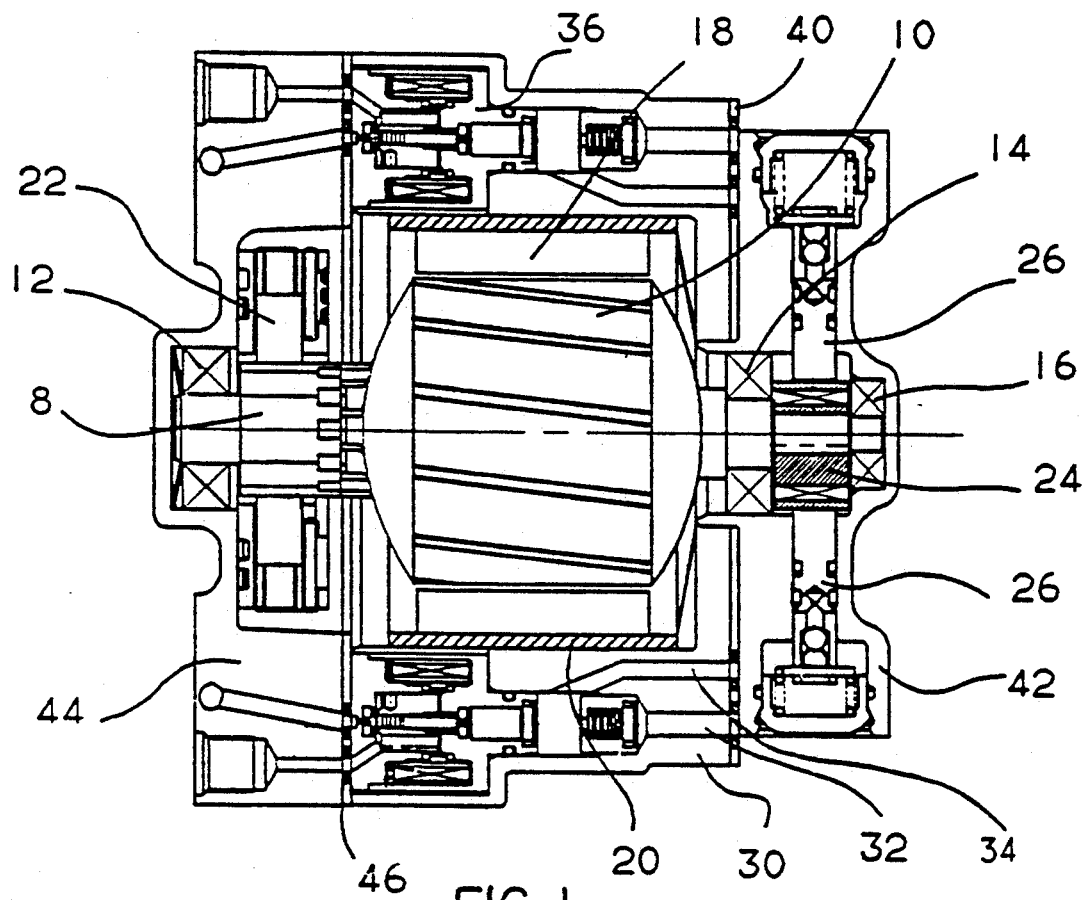
FIG. 1 is a diagrammatic view in axial section of a device according to the invention comprising 4 solenoid valves.

Referring now to the Figures, these illustrate the same preferred device according to the present invention diagrammatically in various sections.

The electric motor consists, here, of a rotor 10 which is arranged substantially in the axis of the device and the shaft 8 of which rotates on bearings 12, 14. The coils of the rotor 10 are opposite a plurality of permanent magnets 18 fastened to a cylindrical sleeve 20 made of metallic material and intended for closing the magnetic field. In a conventional way, carbon brushes 22 alternately make the electrical connection with the coils of the rotor 10.

The shaft 8 of the rotor 10 is fixed to an eccentric cam 24 converting the rotational movement of the rotor into an alternating translational movement of the radial pistons 26 of a pump.

The sleeve 20 is enclosed in a housing 30 produced from a non-magnetic material, for example aluminum, or from a thermosetting material having some thickness intended for increasing the thermal and the acoustic inertia of the device. Fluid circulation channels 32, 34 have been made in the thickness of this housing, allowing some dissipation of the heat generated by the operation of the motor. These channels 32 extend longitudinally in the housing 30 and preferably have axes substantially parallel to that of the rotor.

Likewise arranged in the housing 30 are four solenoid valves 36 (in the example illustrated), the axes of which are likewise parallel to that of the rotor 10, so as to form substantially a square, as seen axially.

Figure 2:
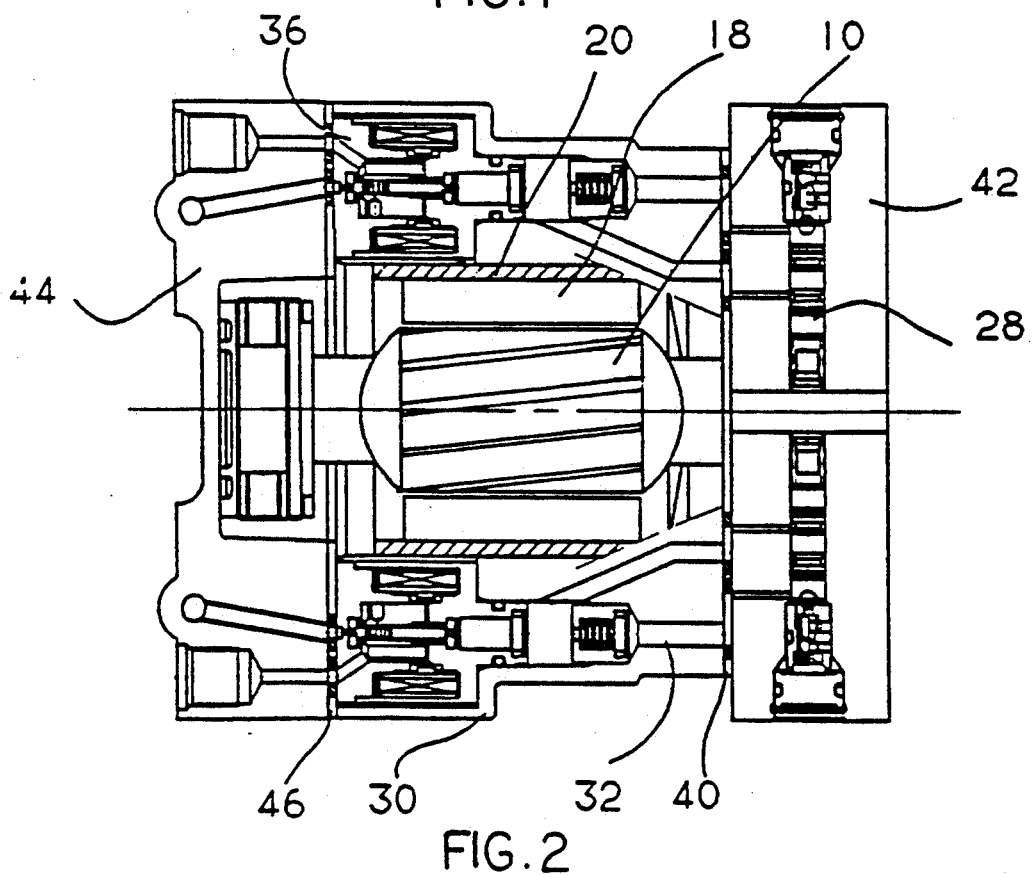
FIG. 2 is a view of the device of FIG. 1 in section in a plane parallel to the axis and including the axes of two adjacent solenoid valves.

The housing 30 is closed axially by a radial cover 42 which includes the pump pistons 26 and the bearings 14 and 16 of the shaft 8 of the rotor 10 and of the cam 24 as well as the conventional distribution slides 28 (FIG. 2). Between the cover 42 and the housing 30 is arranged a plate 40 ensuring the various hydraulic connections between the hydraulic parts included in the cover 42 and those included in the housing 30.

This plate 40, like the plate 46 which will be seen later, is thin and produced, for example, from aluminum, pierced and machined in a suitable way to provide fluid passages between the channels of the housing 30 and those of the corresponding cover. Gaskets ensure the sealing of each passage when the plate is compressed between the housing and the cover.

Figure 5:
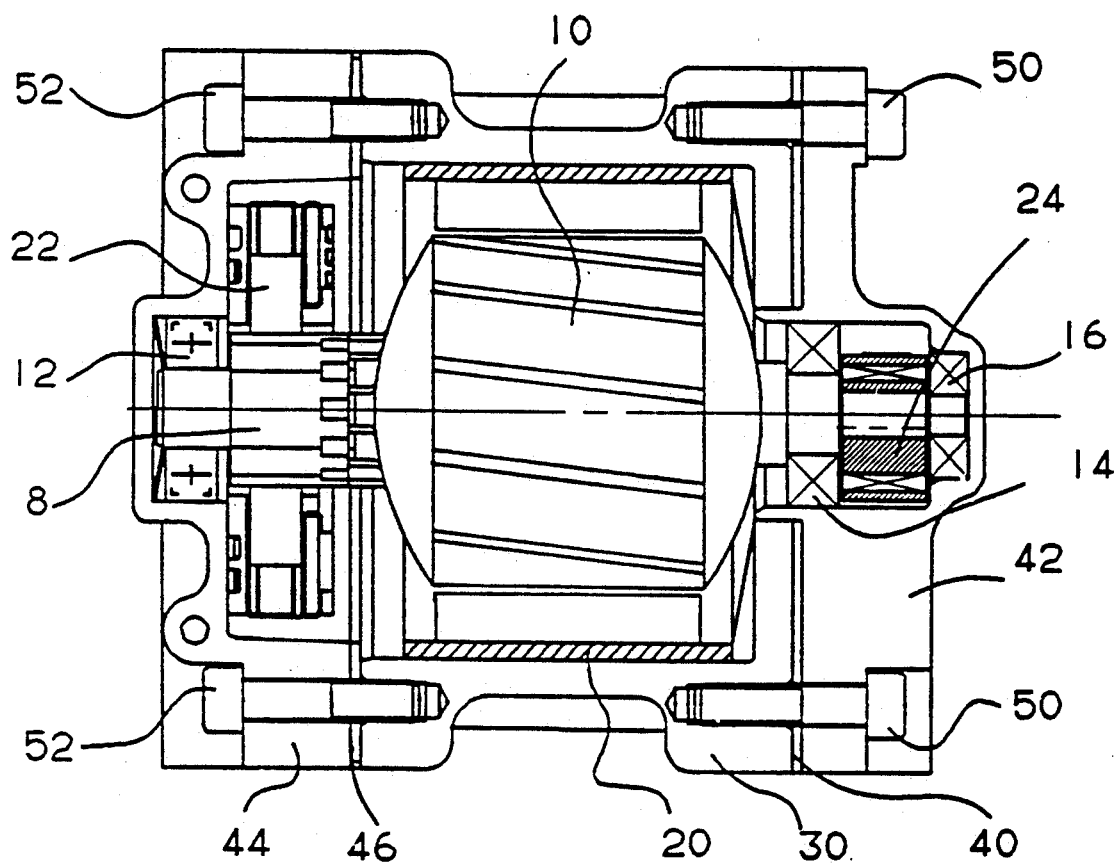
FIG. 5 is a view in axial section of the device of FIG. 1 after rotation through 45° about the axis.

A fastening means, for example screws 50 (FIGS. 3 and 5), ensures that the cover 42 is firmly retained on the housing 30 sealingly for the hydraulic parts, especially opposing the pressures transmitted by the fluid circulating in these channels.

On the other side, the housing 30 is closed by a cover 44 including the electrical connections, the carbon brushes 22 and the bearing 12 of the shaft 8 of the rotor 10 as well as the hydraulic ducts for connection to the outside of the device.

Likewise arranged between the cover 44 and the housing 30 is a plate 46 ensuring the hydraulic connections of one to the other, this plate 46 being of the type described above.

A fastening means, for example screws 52 (FIG. 5), ensures that the cover 44 is fastened to the housing 30.

Figure 3:
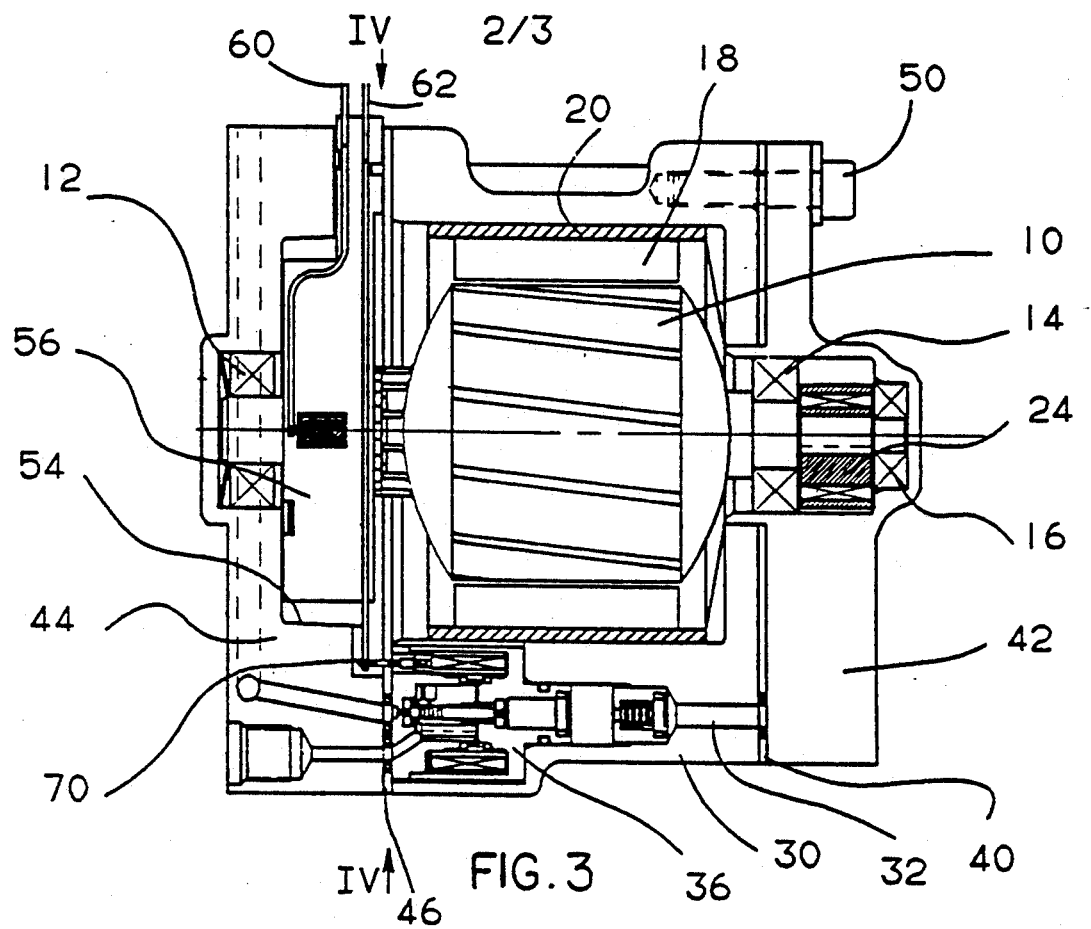
FIG. 3 is a view of the device of FIG. 1 in section along the line III—III of FIG. 4.
Figure 4:
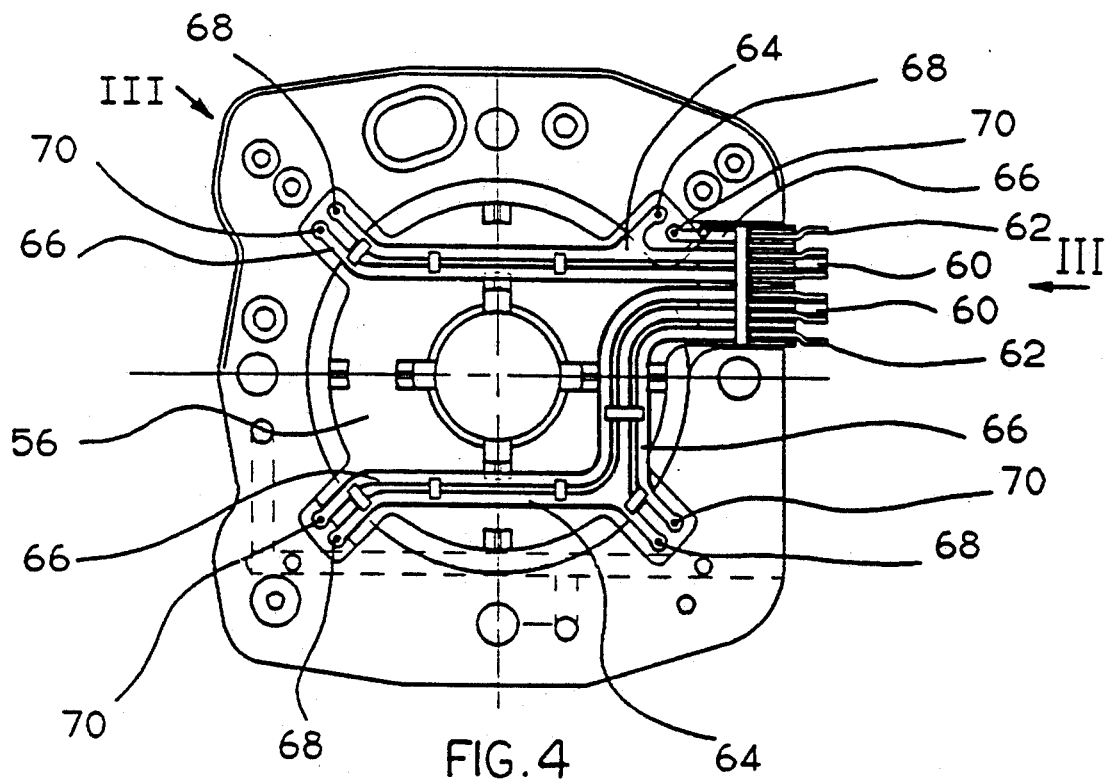
FIG. 4 is a view in radial section along the line IV—IV of FIG. 3.

As illustrated more clearly in FIG. 3, the cover 44 has a central recess 54, in which an electrical connection module 56 is arranged.

This module 56 includes particularly a connector 60 connected to the carbon brushes 22 and ensuring the supply of electricity to the motor and a second connector, the number of pins 62 of which depends on the number of solenoid valves 36 employed in the device. A first electrical circuit is printed on one face of this module, for the purpose of connecting the connector 60 to the carbon brushes 22, and another electrical circuit is printed on the other face of this module 56, in order to bring the supply of electricity from the pins 62 to the solenoid valves 36. The latter printed circuit comprises an earthed conductor track 64 common to one 68 of the pins of each solenoid valve and a conductor track 66 particular to each of the solenoid valves and connected to the other pin 70 of the solenoid valves 36. FIG. 3 shows the connection to the pin 70 of the solenoid valve 36.

It will be appreciated that other components, such as a current-smoothing filter or motor rotational-speed sensor, can easily be arranged on this module 56.

As illustrated in the Figures, the electrical connections of the solenoid valves are in the same radial plane, and the latter is adjacent to the plane of the electrical connections of the rotor.

This provides an independent module 56 which is easy to install and which makes the necessary electrical connections directly.

Since the housing 30 is of considerable thickness, it becomes possible to glue the permanent magnets 18 to the inner wall of the sleeve 20 without any harmful effect, and to use rare-earth magnets as a result of the improved thermal inertia of the device.

The covers 42 and 44 can likewise be produced from aluminum or from a thermosetting material. However, the cover 42 which includes the pump pistons 26 can alternatively be produced from cast iron, to avoid installing liners.

The modular design just described allows an appreciable time saving in the series assembly of the device and a considerable reduction in the cost as a result of the simplicity of the machining required for each element. Finally, a substantial decrease in the pressure losses in the fluid has been noted, this doubtless being attributable to simpler hydraulic connections.

In one embodiment, a hydraulic capacity (not shown) for low-pressure fluid additionally making it possible to increase the thermal exchanges has been added in the housing. This capacity preferably has a longitudinal axis parallel to that of the rotor 10.

Although only one preferred embodiment of the invention has been described, it is clear that an average person skilled in the art can make many modifications to it, without thereby departing from the scope of the invention.

We claim:

1. A hydraulic wheel-braking device, for one of wheel anti-lock and anti-slip functions in a brake circuit of a vehicle, comprising, between a chamber of a master cylinder and at least one brake motor, a plurality of solenoid valves and a hydraulic pump driven by an electric motor including a rotor arranged between two bearings and enclosed in a cylindrical sleeve made of metallic material, said rotor driving in rotation an eccentric cam imparting an alternating translational movement to radial pistons, a delivery outlet of said pump being connected to said solenoid valves via hydraulic slides by means of fluid circulation channels, characterized in that said sleeve, in which the rotor is accommodated, is enclosed in a housing made of non-magnetic material, the fluid circulation channels and the solenoid valves extending in said housing along longitudinal axes substantially parallel to the longitudinal axis of the rotor of said motor, electrical connections of said solenoid valves being substantially in the same radial plane and substantially adjacent to a plane containing electrical connections of said motor, and a first of said bearings included in a first cover closing one radial end of said housing and containing electrical control circuits of said solenoid valves and of said motor.

2. The hydraulic wheel-braking device according to claim 1, characterized in that said first cover has a central recess in which an electrical connection module is accommodated.

3. The hydraulic wheel-braking device according to claim 2, characterized in that an electrical control circuit is printed on one face of said module for the purpose of supplying power to said motor, and a second electrical control circuit is printed on the other side of said module for the supply of electricity to said solenoid valves.

4. The hydraulic wheel-braking device according to claim 3, characterized in that a first plate is arranged between said first cover and said housing in order to ensure hydraulic connections between said first cover and said housing.

5. The hydraulic wheel-braking device according to claim 4, characterized in that a second bearing of said two bearings is included in that a second cover closing the other radial end of said housing and enclosing the radial pistons and the hydraulic slides.

6. The hydraulic wheel-braking device according to claim 5, characterized in that said eccentric cam is arranged between the second bearing and another bearing included in said second cover.

7. The hydraulic wheel-braking device according to claim 6, characterized in that a second plate is arranged between said housing and said second cover in order to ensure hydraulic connections between said housing and said second cover.

8. The hydraulic wheel-braking device according to claim 7, characterized in that fastening means retains said first and second covers firmly against said housing for hydraulic sealing.

9. The hydraulic wheel-braking device according to claim 8, characterized in that at least one of said housing, of said first cover and of said second cover is produced from a thermosetting material.

10. The hydraulic wheel-braking device according to claim 8, characterized in that at least one of said housing, of said first cover and of said second cover is produced from aluminum.

11. The hydraulic wheel-braking device according to claim 8, characterized in that said second cover which includes said radial pistons is produced from cast iron.

* * * * *